United States Patent
Kucharyson

(10) Patent No.: US 7,815,407 B2
(45) Date of Patent: Oct. 19, 2010

(54) SELF-DRILLING ANCHOR

(76) Inventor: Paul Kucharyson, 1900 Lehigh St., Boulder, CO (US) 80305

( * ) Notice: Subject to any disclaimer, the term of this patent is extended or adjusted under 35 U.S.C. 154(b) by 165 days.

(21) Appl. No.: 12/283,521

(22) Filed: Sep. 12, 2008

(65) Prior Publication Data

US 2009/0074533 A1 Mar. 19, 2009

Related U.S. Application Data

(60) Provisional application No. 60/993,671, filed on Sep. 14, 2007.

(51) Int. Cl.
*F16B 21/00* (2006.01)
(52) U.S. Cl. .................. 411/341; 411/344; 411/903
(58) Field of Classification Search ............ 411/16, 411/21, 25, 28, 52, 55, 60.3, 80.1, 340–345, 411/347, 903
See application file for complete search history.

(56) References Cited

U.S. PATENT DOCUMENTS

| | | | | | |
|---|---|---|---|---|---|
| 2,398,220 | A | * | 4/1946 | Gelpcke | 411/342 |
| 2,916,235 | A | * | 12/1959 | Nagel | 248/497 |
| 2,950,141 | A | * | 8/1960 | Koff | 292/256.73 |
| 4,116,104 | A | * | 9/1978 | Kennedy | 411/427 |
| 4,793,755 | A | * | 12/1988 | Brown | 411/342 |
| 5,226,768 | A | * | 7/1993 | Speer | 411/344 |
| 5,244,324 | A | * | 9/1993 | Smith | 411/344 |
| 5,322,401 | A | * | 6/1994 | Vernet et al. | 411/344 |
| 6,435,789 | B2 | * | 8/2002 | Gaudron | 411/344 |
| 6,884,012 | B2 | * | 4/2005 | Panasik | 411/342 |
| 2005/0053444 | A1 | * | 3/2005 | Panasik | 411/340 |

* cited by examiner

*Primary Examiner*—Gary Estremsky
(74) *Attorney, Agent, or Firm*—Scott L. Terrell, P.C.; Scott L. Terrell

(57) ABSTRACT

A self-drilling anchor is provided which includes an elongated tapered plastic body and anchor assembly. The body has an external helical threaded portion, a central clear bore for receiving the anchoring assembly, two diametrically opposed break-away slotted portions, and an axial driving flange concentrically positioned relative to the tapered body first end. The flange has inner and outer walls, a central clear aperture for receiving a screw driver, and at least two diametrically opposed notches for receiving a bladed driver for drilling the tapered body into a hollow wall. The anchoring assembly is centrally received in the clear bore, and includes an externally threaded screw, a collar, and at least two diametrically opposed separable arms. The collar is internally threaded for receiving the screw. The separable arms have spring loaded ends and pointed ends. The spring loaded ends are pivotally attached to the collar. The pointed ends of the separable arms form a disconnected pointed drilling tip when pivoted in a collapsed orientation, and an anchor supporting orientation when operated for separation, by rotation of the screw, through the break away slotted portions, for engagement of the separable arms with an inner surface of the hollow wall to be anchored.

11 Claims, 3 Drawing Sheets

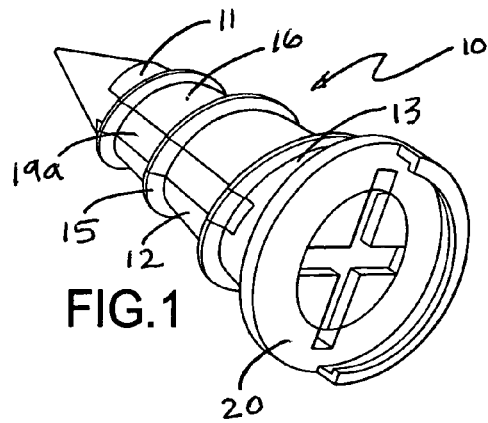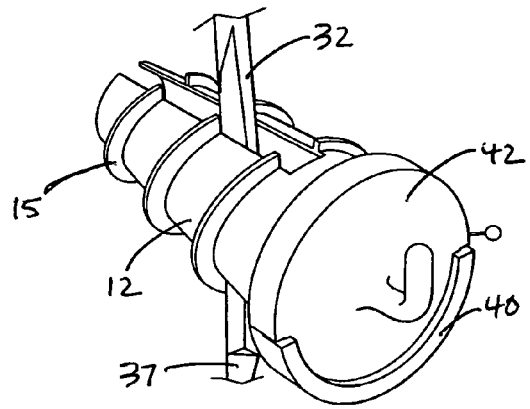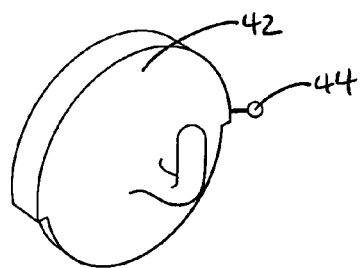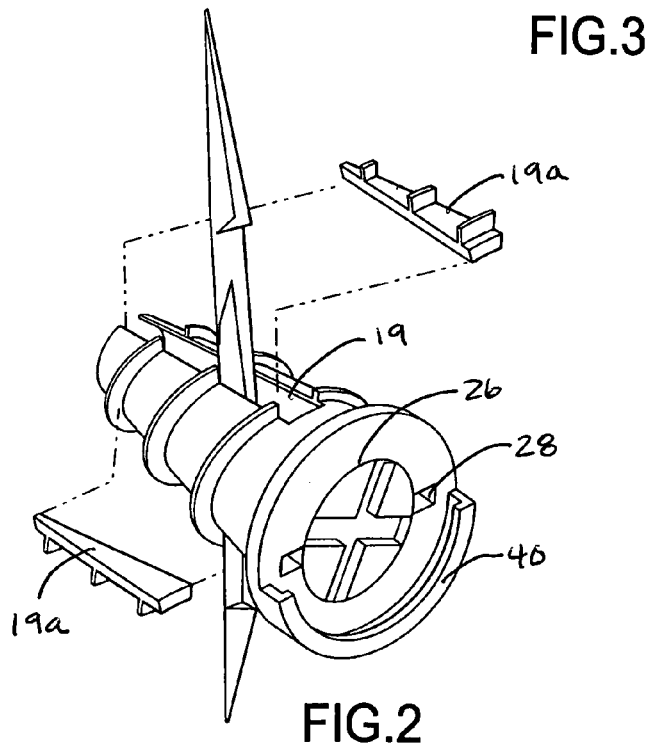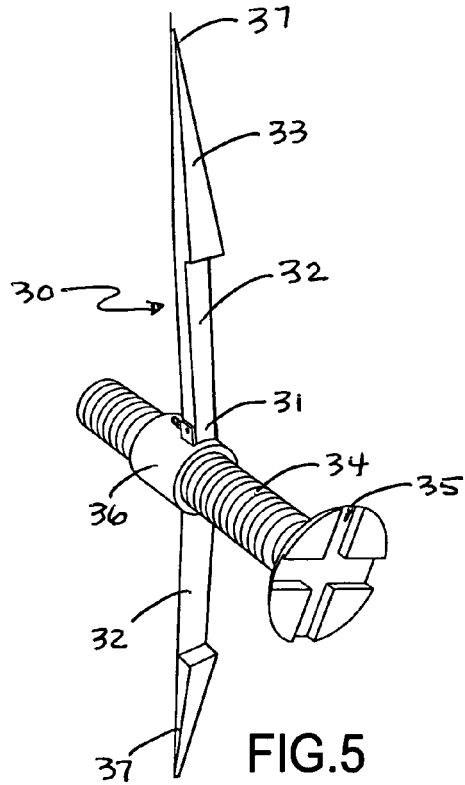

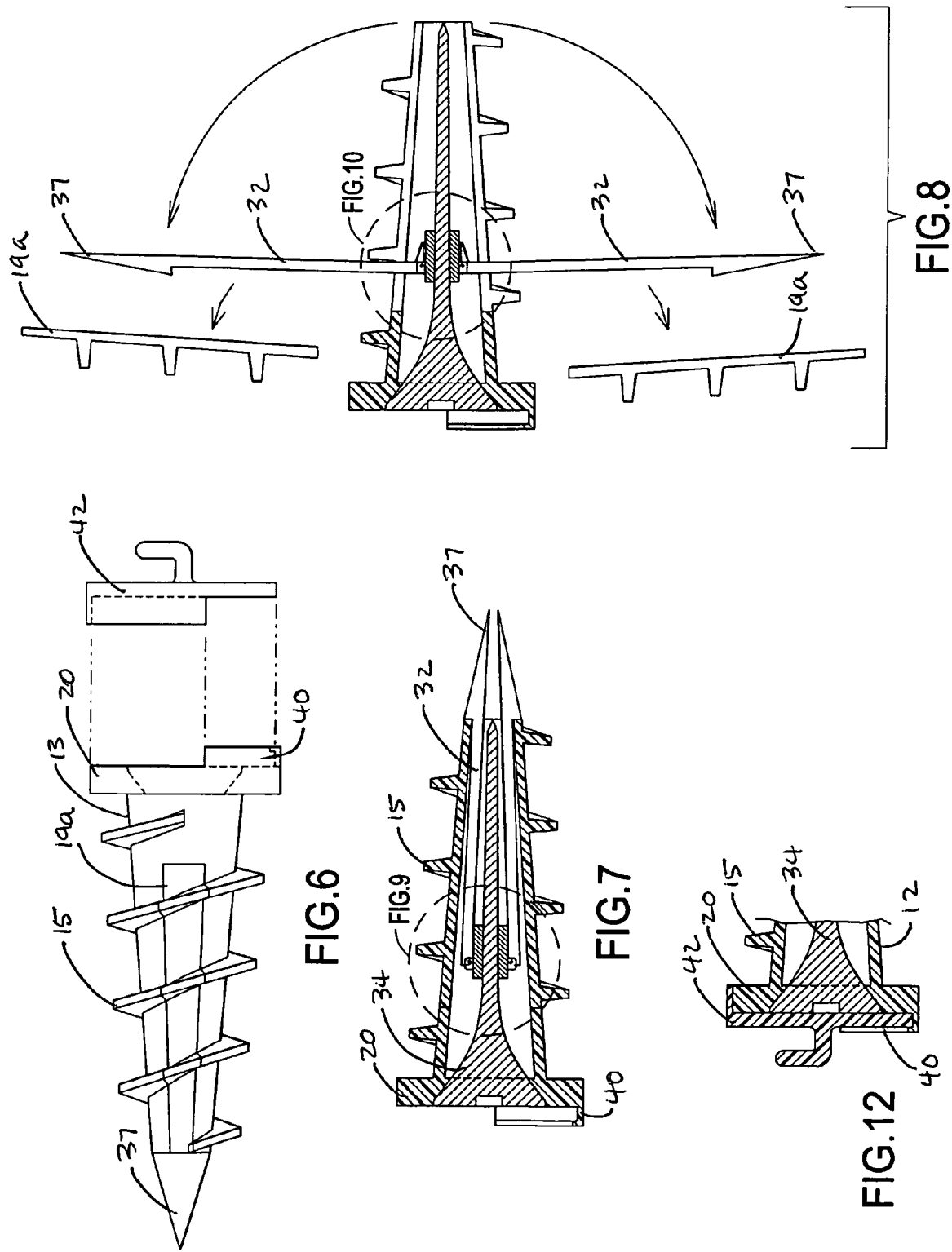

SELF-DRILLING ANCHOR

CROSS REFERENCE TO RELATED APPLICATIONS

Pursuant to 35 U.S.C. 119(e), applicant claims the benefit of U.S. Ser. No. 60/993,671, filed, pursuant to 35 U.S.C. 111(b), on Sep. 14, 2007.

BACKGROUND OF THE INVENTION

1. Field of the Invention

The present invention relates to self-drilling anchors. In particular, it relates to a self-drilling anchor assembly and system for suspending a member from a hollow wall.

2. Description of the Related Art

Conventional hollow wall anchors are well known in the art. These anchors have evolved along a common conception in the design of anchoring members to a hollow wall. One such design is the toggle bolt anchor, exemplified by the TOGGLER® anchor, which when positioned, expands behind the inner surface of a wall, to spread the holding load against a greater surface of the wall. In this manner, the toggle bolt anchor provides an ability to support a heavy load. However, this type of anchor requires pre-drilled holes for installation and often damage to the wall, upon removal. Self-drilling anchors are also well known. These anchors generally include a plastic tapered body having external helical threads with a contiguous driving end for taping into a hollow wall without the need for a predrilled aperture in the wall. Up until now, a few such examples of self drilling anchors exist.

One such example, U.S. Pat. No. 6,196,780 to Wakai et al., discloses a threaded anchor having a hollow shank. The shank has a head at one end, an integral blade portion at the other end, and is formed with external threads on the outer periphery. Cuts are formed in a peripheral wall for the shank to define a bendable portion. The bendable portion is adapted to bend when pushed out by a mounting screw driven into the hollow shank. The blade portion is semicylindrical with side edges defining cutting edges. Tips for inclining the mounting screw are formed on the inner surfaces of the blade portion and the hollow shaft, respectively. When a mounting screw is driven through the article into the anchor to fix an article to the board, the mounting screw is inclined relative to the anchor, so that the bendable portion is pushed out, thus preventing the anchor form rotating together with the screw.

Another example, U.S. Pat. No. 7,144,212 to Kaye et al., discloses a self-drilling hollow wall anchor. The anchor has a self drilling threaded installation body adapted to be broken, after positioning, by inserting a screw into expandable anchoring elements. The anchoring elements are designed to engage internally formed cams and the distal surface of the wall into which the anchor is deployed. The anchoring elements are made of a plastic which is designed as a compromise such that it is sufficiently ridged in order to effect a threaded insertion and also to be broken apart. The anchor also includes anti-rotation elements to retard over-tightening and anchor removal prior to screw removal.

While the foregoing examples offer some utility, a major disadvantage in each lies in the fact that, while they do provide for a self drilling anchor, they do not provide the high load bearing capacity of a toggle bolt anchor, and their one piece plastic design is inherently compromised in providing a drilling tip strength but are made of sufficient flexibility so as to allow for expansion of the internal anchoring members. The foregoing examples are also difficult to remove and are limited in application for use in the anchoring of members which can be suspended through the head of a screw. Thus, it is desirable to provide a self-drilling anchor which is designed to provide the high load bearing capacity in conjunction with a hardened pin-point drilling tip for accurate placement, but which is also easily removed without damage to the wall and which is capable of suspending members other than through the head of a screw. The present invention satisfies these needs.

BRIEF SUMMARY OF THE INVENTION

It is therefore an object of the present invention to provide a self-drilling anchor which provides a high load bearing capacity.

It is another object of the present invention to provide a self-drilling anchor which provides a hardened pin-point drilling tip for accurate placement, but which is sufficiently flexible for ease in installation.

It is yet another object of the present invention to provide a self-drilling anchor which is reusable, easy in removal with minimal damage to the hollow wall, and which is capable of suspending members other than through the head of a screw.

To overcome the problems of the prior art methods and in accordance with the purpose of the invention, as embodied and broadly described herein, briefly a self-drilling anchor, for deployment into a hollow wall, is provided. The anchor has an elongated tapered plastic body. The body has first and second ends, an external helical threaded portion positioned between the first and the second ends, a central longitudinal clear bore for receiving an anchoring assembly, two diametrically opposed break-away slotted portions extending from the second end through the threaded portion, and an axial driving flange concentrically positioned relative to the tapered body first end. The axial driving flange includes inner and outer walls, a central clear aperture for receiving a rotating screw driver, and at least two diametrically opposed notches for receiving a bladed driver, for rotating the tapered body into the hollow wall. An anchoring assembly is centrally received in the clear bore and includes an externally threaded screw, a collar, and at least two diametrically opposed separable arms. The threaded screw includes a slotted head having an outer surface circumferentially biased adjacent to the inner wall of the flange. The collar is internally threaded for receiving the screw. The separable arms have first spring loaded ends and a second pointed ends. The first spring loaded ends are pivotally attached to the collar. The second ends of the separable arms form a disconnected pointed drilling tip when pivoted in a collapsed orientation, relative to the screw, and an anchor supporting orientation when separated through rotation of the screw, through the break away slotted portions for engagement of the separable arms with an inner surface of the hollow wall, to be anchored.

Additional advantages of the present invention will be set forth in part in the description that follows and in part will be obvious from that description or can be learned from practice of the invention. The advantages of the invention can be realized and obtained by the apparatus particularly pointed out in the appended claims.

BRIEF DESCRIPTION OF THE SEVERAL VIEWS OF THE DRAWINGS

The accompanying drawings, which are incorporated in and which constitute a part of the specification, illustrate at least one embodiment of the invention and, together with the description, explain the principles of the invention.

FIG. 1 is a perspective view of the self-drilling screw in accordance with the present invention.

FIG. 2 is a perspective view of the self-drilling screw in accordance with the present invention showing the break-away slots of the helical body portion receiving the separable arms in an anchoring orientation.

FIG. 3 is a perspective view of the present invention showing configuration of a cap and pinned connector for coaxial alignment with the flange in a recessed lip.

FIG. 4 is a perspective view of the self-drilling screw in accordance with the present invention showing the separable arms in an anchoring orientation and the cap having a hook slidably received in the recessed lip of the flange.

FIG. 5 is a perspective view of the self-drilling screw in accordance with the present invention showing the anchoring assembly including the separable arms pivotally attached to the collar when actuated in an anchoring orientation.

FIG. 6 is a side view of the self-drilling screw in accordance with the present invention showing fastening orientation of the cap in relation to the recessed lip of the flange.

FIG. 7 is a sectional view of the self-drilling screw in accordance with the present invention shown in a drilling orientation.

FIG. 8 is a sectional view of the self-drilling screw in accordance with the present invention showing the break away of the helical threaded slotted portions when the separable arms are actuated outwardly, through tightening of the screw, in an anchoring orientation.

FIG. 12 is a sectional view of the self-drilling screw in accordance with the present invention showing fastening orientation of the cap in relation to the flange recessed lip.

DETAILED DESCRIPTION OF THE INVENTION

Figure 9:
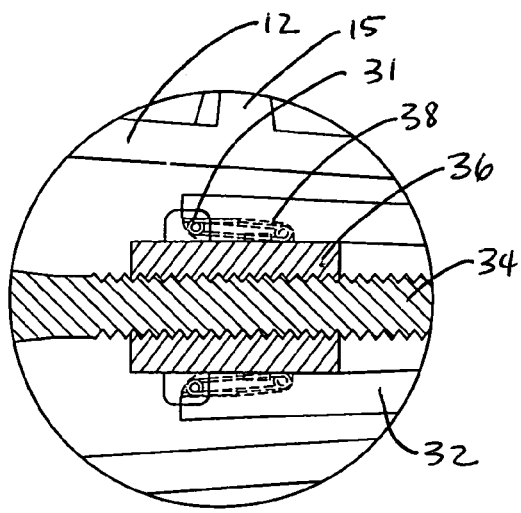
FIG. 9 is an exploded view of the self-drilling screw in accordance with the present invention showing a preferred embodiment of the collar, separable arms, and preferred torsion spring assembly in a drilling orientation.
Figure 10:
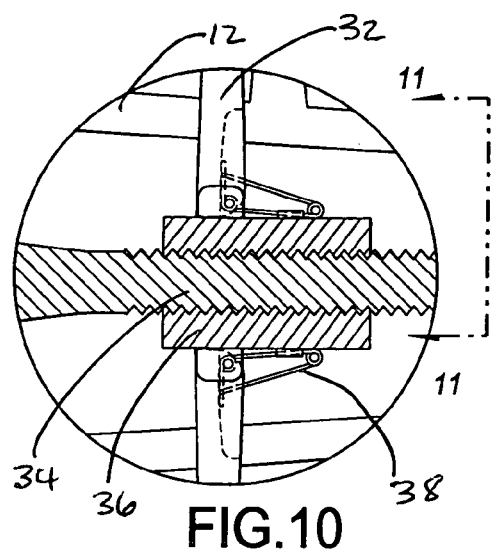
FIG. 10 is an exploded view of the self-drilling screw in accordance with the present invention showing a preferred embodiment of the collar, separable arms, and torsion spring assembly in an anchoring orientation.
Figure 11:
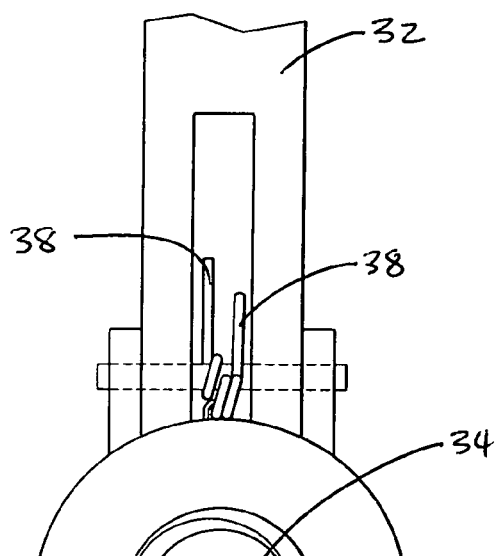
FIG. 11 is top view of the self-drilling screw in accordance with the present invention showing a preferred torsion spring, collar, and separable arm assembly.
Figures 13, 14:
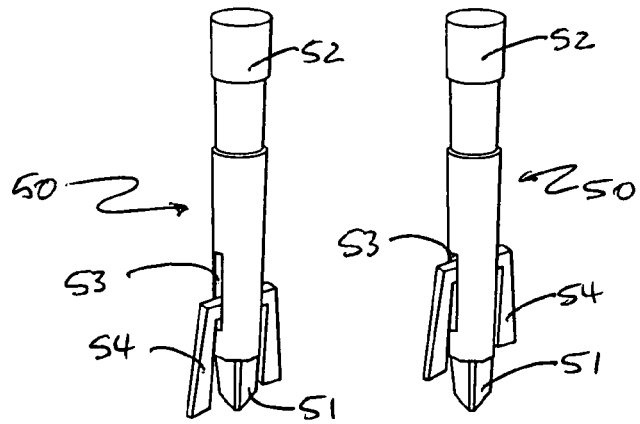
FIG. 13 is an isometric view of the driver assembly in accordance with the present invention showing the driving blades in a downward position for use in rotating the flange for drilling the anchor into a hollow wall.
FIG. 14 is an isometric view of the driver assembly in accordance with the present invention showing the driving blades in an upward position for use in rotating the screw to actuate the separable blades outwardly in an anchoring orientation.
Figures 15, 16:
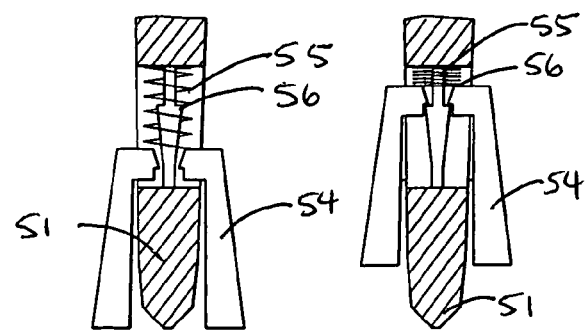
FIG. 15 is a sectional view of the driver assembly in accordance with the present invention showing a preferred embodiment of the compression spring and latch assembly biasing against the driving blades when positioned for use in rotating the flange when drilling the anchor into a hollow wall.
FIG. 16 is a sectional view of the driver assembly in accordance with the present invention showing a preferred embodiment of the compression spring and latch assembly where the driving blades are latched in an upward position for exposing the screw driving end for use in actuating the separable blades outwardly in an anchoring orientation.

Unless specifically defined otherwise, all technical or scientific terms used herein have the same meaning as commonly understood by one of ordinary skill in the art to which this invention belongs.

Although any of the methods and materials similar or equivalent to those described herein can be used in the practice or testing of the present invention, the preferred methods and materials are now described. Reference will now be made in detail to the presently preferred embodiments of the invention, examples of which are illustrated in the accompanying drawings wherein like numerals represent like features of the invention.

Referring now to the drawing figures, a self-drilling anchor 10 is provided for deployment into a hollow wall. The anchor 10 has an elongated tapered plastic body 12. The body 12 is defined by first 11 and second ends 13 with an external helical threaded portion 16, having helical threads 15, between the first 11 and the second 13 ends. A central longitudinal clear bore 18 is provided to receive the anchoring assembly 30. The body 12 is made of a sufficiently flexible plastic, or polymer, so that the threaded portion 16 employs two diametrically opposed break-away slotted 19, 19a portions, which break away subsequent to drilling the anchor 10 into the hollow wall upon actuation of the separable arms 32 outwardly by tightening the screw 34.

An axial driving flange 20 is concentrically positioned relative to the tapered body 12 first end 11. The axial driving flange 20 is designed with inner 22 and outer walls 24, a central clear aperture 26 for receiving a screw driver for actuating the screw 34, and at least two diametrically opposed notches 28 for receiving a bladed driver for use in drilling the tapered body 12 into the hollow wall.

An anchoring assembly 30 includes an externally threaded screw 34, a collar 36, and at least two diametrically opposed separable arms 32. The threaded screw 34 is centrally received in the central longitudinal bore 18 of the body 12, and is actuated with a driver keyed into a slotted head 35. The slotted head 35 has an outer surface which is circumferentially biased adjacent to the inner wall 22 of the flange 20, so as to retain the anchoring assembly 30 within the central bore 18 of the body 12. In this manner, the self-drilling anchor 10 provides a single unit assembly which allows for ease in installation and removal. The collar 36 is internally threaded for receiving the screw 34. The separable arms 32 are designed with a first spring loaded ends 31 and a second pointed ends 33. The first spring loaded ends 31 are pivotally attached, along a longitudinal axis, to the collar 36. The second ends 33 of the separable arms 32, form a ridged disconnected drilling tip 37 when pivoted in a collapsed orientation relative to the screw 34. The separable arms 32 are then pivoted outwardly and an anchor supporting orientation through the break-away slots 19 when separated by tightening the screw 34 to an orientation which is at right angles relative to the screw 34 for engagement of the separable arms 32 parallel with an inner surface of the hollow wall, to be anchored. In a preferred embodiment, torsion springs 38 are provided which bias against the collar 36 and separable arms 32 at the pivot point. In this manner, the torsion springs 38 facilitate actuation of the separable arms 32 outwardly, breaking away the slotted portions 19a, through the resulting slots of the self drilling body 12.

In at least one preferred embodiment, the present invention may, but need not, include a semicircular flange with an outwardly extending recessed lip 40 and cap 42 assembly for interchangeable use of a variety of suspended members such as hooks, fasteners, or decorative articles. Here, the flange 20 incorporates an outwardly extending recessed lip 40. The recessed lip 40 is shaped so as to receive a complimentary configured cap 42 which is preferably inserted into the recessed lip 40 for secure attachment of the cap 42 to the flange 20. The cap 42 and flange 20 may also, but need not, include a pin fastener 44 slidably drilled into the cap 42 and received into a hole in the flange 20 for securing the cap 42 to the flange 20.

In yet another preferred embodiment of the present invention the self-drilling anchor assembly includes a complete system for deployment and anchoring of the anchor assembly 10 into the hollow wall. Here, a rotating driver 50 is designed to include first 52 and second ends 51, a lower slotted portion 53, and diametrically opposed driver blades 54. A distal portion of the second end 51 is formed as a key, such as a Phillips head driver, for driving the slotted head of the screw 34. In the preferred embodiment, the driver blades 54 are slidably received in the slotted portion 53 of the driver. When positioned downwardly in the slotted portion 53, the driving blades 54 operate to rotate the flange 20 for driving the tapered body 12 into the hollow wall. When positioned upwardly, the driving blades 54 are withdrawn to expose the second end 51, or Phillips head, in order to tighten the screw 34 for anchoring the separable arms 32 against an inner surface of the hollow wall. The slotted portion of the driver may further include a compression spring 55 and latch 56 assembly in an inner cavity of the second end 51 of the driver 50, the spring 55 forcing downwardly on the driving blades 54 in order to operate the anchor body 12 for drilling the anchor 10 into a wall, and the latch 56 holding the drilling blades 54 upwardly to expose the Phillips head for operating the screw 34 to an anchoring orientation.

In use, the anchor assembly 10 is simply drilled into a hollow wall at the desired location using a flat bladed driver keyed into the notches 28 of the flange 20 to rotate the anchor body 12 into the wall. When snug, a screw driver, such as a Phillips head, is used to rotate and tighten the screw 34 in order to anchor the separable arms 32 outwardly against an inner surface of the wall. If so desired, the cap 42 is then simply slid onto the recess lip 42 of the flange 20 for attaching an article to be suspended.

While the present invention has been described in connection with the embodiments as described and illustrated above, it will be appreciated and understood by one of ordinary skill in the art that modifications may be made in the anchor assembly in accordance with the present invention without departing from the true spirit and scope of the invention as described and claimed herein.

I claim:

1. A self-drilling anchor assembly for deployment into a hollow wall, comprising:
   (a) an elongated tapered plastic body having a first and a second ends, an external helical threaded portion between the first and the second ends, a central longitudinal clear bore, two diametrically opposed break-away slotted portions extending from the second end through the threaded portion, and an axial driving flange concentrically positioned relative to the tapered body first end, wherein the axial driving flange includes an inner and an outer walls, a central clear aperture for receiving a rotating screw driver, and at least two diametrically opposed notches for receiving a rotating driver for rotating the tapered body into the hollow wall; and
   (b) an anchoring means including an externally threaded screw, a collar, and at least two diametrically opposed separable arms, the threaded screw centrally received in the central longitudinal bore and including a slotted head having an outer surface circumferentially biased adjacent to the inner wall of the flange, the collar internally threaded for receiving the screw, and the separable arms having a first spring loaded ends and a second pointed ends, the first spring loaded ends pivotally attached, along a longitudinal axis, to the collar, the second ends of the separable arms forming a disconnected drilling tip when pivoted in a collapsed orientation relative to the screw and an anchor supporting orientation when separated by rotation of the screw through the break away slotted portions at right angles relative to the screw for engagement of the separable arms with an inner surface of the hollow wall to be anchored.

2. The self-drilling anchor according to claim 1, wherein the second pointed end of the separable arms further includes a barb for rotationally fixed engagement of the separable arms in relation to the inner surface of the hollow wall to be anchored.

3. The self-drilling anchor according to claim 1, wherein the flange further comprises an outwardly extending semicircular recessed lip portion for receiving a cap.

4. The self-drilling anchor according to claim 3, further comprising a cap having a semicircular portion slidably received, in coaxial alignment, in the recessed lip.

5. A self-drilling anchor system for deployment of a self-drilling anchor into a hollow wall, comprising:
   (a) an elongated tapered plastic body having a first and a second ends, an external helical threaded portion between the first and the second ends, a central longitudinal clear bore, two diametrically opposed break-away slotted portions extending from the second end through the threaded portion, and an axial driving flange concentrically positioned relative to the tapered body first end, wherein the axial driving flange includes an inner and an outer walls, a central clear aperture for receiving a rotating screw driver, and at least two diametrically opposed notches for receiving a rotating driver for rotating the tapered body into the hollow wall; and
   (b) an anchoring means including an externally threaded screw, a collar, and at least two diametrically opposed separable arms, the threaded screw centrally received in the central longitudinal bore and including a slotted head having an outer surface circumferentially biased adjacent to the inner wall of the flange, the collar internally threaded for receiving the screw, and the separable arms having a first spring loaded ends and a second pointed ends, the first spring loaded ends pivotally attached, along a longitudinal axis, to the collar, the second ends of the separable arms forming a disconnected drilling tip when pivoted in a collapsed orientation relative to the screw and an anchor supporting orientation when separated by rotation of the screw through the break away slotted portions at right angles relative to the screw for engagement of the separable arms with an inner surface of the hollow wall to be anchored; and
   (c) a rotating driver having a first and a second ends, a lower slotted portion, and diametrically opposed driver blades, a distal portion of the second end having a key for driving the slotted head of the screw, and the driver blades slidably received in the slotted portion for driving the tapered body when slid in a downward orientation relative to the first end.

6. The self-drilling anchor system according to claim 5, wherein the second pointed end of the separable arms further includes a barb for rotationally fixed engagement of the separable arms with the inner surface of the hollow wall to be anchored.

7. The self-drilling anchor system according to claim 5, wherein the flange further comprises an outwardly extending semicircular recessed lip portion for receiving a cap.

8. The self-drilling anchor system according to claim 5, wherein the first end of the rotating driver is a drill chuck key.

9. The self-drilling anchor system according to claim 5, wherein the first end of the rotating driver is a handle.

10. The self-drilling anchor system according to claim 5, wherein the slotted portion of the rotating driver includes a means for spring loading the diametrically opposed blades in a downward orientation relative to the rotating driver first end.

11. The self-drilling anchor according to claim 7, further comprising a cap having a semicircular portion slidably received, in coaxial alignment, in the recessed lip.

* * * * *